United States Patent [19]
Morgan

[11] 3,707,731
[45] Jan. 2, 1973

[54] ARTIFICIAL LEG

[76] Inventor: Robert D. Morgan, 3130 Coldwater Canyon, North Hollywood, Calif. 91604

[22] Filed: June 9, 1971

[21] Appl. No.: 151,220

Related U.S. Application Data

[63] Continuation-in-part of Ser. No. 880,736, Nov. 28, 1969, abandoned.

[52] U.S. Cl. ..................................3/21, 3/7, 3/32, 3/33
[51] Int. Cl. ..............................................A61f 1/08
[58] Field of Search..........................3/21, 22–29, 2, 3/7, 30–33

[56] References Cited

UNITED STATES PATENTS

| | | | |
|---|---|---|---|
| 507,453 | 10/1893 | Read | 3/32 X |
| 612,282 | 10/1898 | Smith | 3/7 |
| 2,897,512 | 8/1959 | Sackett | 3/22 |
| 3,461,464 | 8/1969 | Lingren | 3/21 |

FOREIGN PATENTS OR APPLICATIONS

| | | | |
|---|---|---|---|
| 214,096 | 4/1924 | Great Britain | 3/21 |
| 978,586 | 12/1964 | Great Britain | 3/21 |
| 1,445,102 | 5/1966 | France | 3/21 |
| 847,794 | 8/1952 | Germany | 3/21 |
| 451,768 | 9/1949 | Italy | 3/21 |

Primary Examiner—Richard A. Gaudet
Assistant Examiner—Ronald L. Frinks
Attorney—Herzig & Walsh

[57] ABSTRACT

An artificial leg constructed to be particularly adapted for use by amputees engaged in activities requiring particular degrees of freedom of movement, such as golf. The leg comprises a lightweight socket adapted to receive a stump and a leg part with a joint between the socket and leg part allowing 360° of relative rotation therebetween. The socket and leg part are rigidly aligned. At the lower end of the leg part is a foot with a joint between the foot and leg part allowing lateral tilting of the leg relative to the foot and to provide a cushioning shock absorber effect. The foot member is round and symmetrical about its center, thus, avoiding any problem of foot alignment with the socket and leg stump.

9 Claims, 3 Drawing Figures

PATENTED JAN 2 1973                                            3,707,731
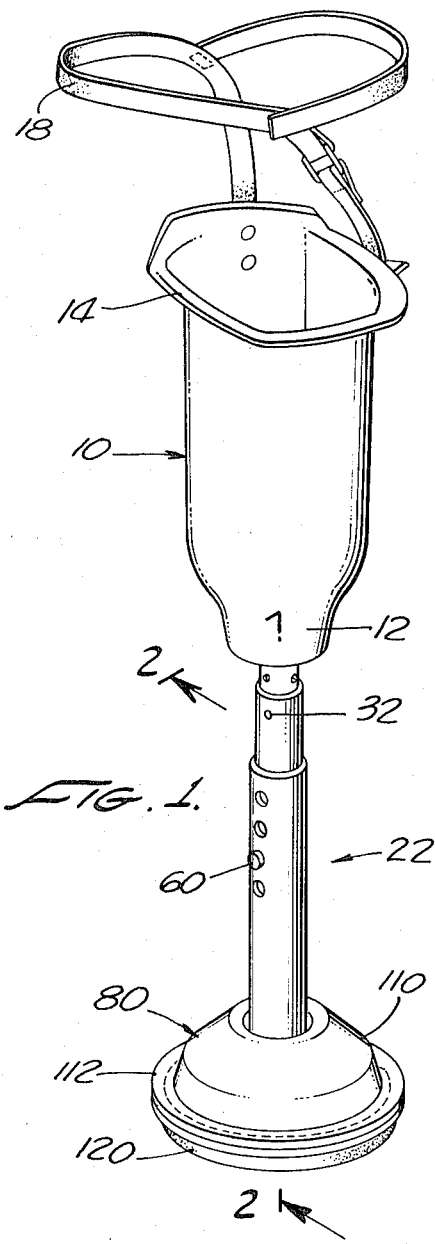
FIG. 1.
FIG. 3.
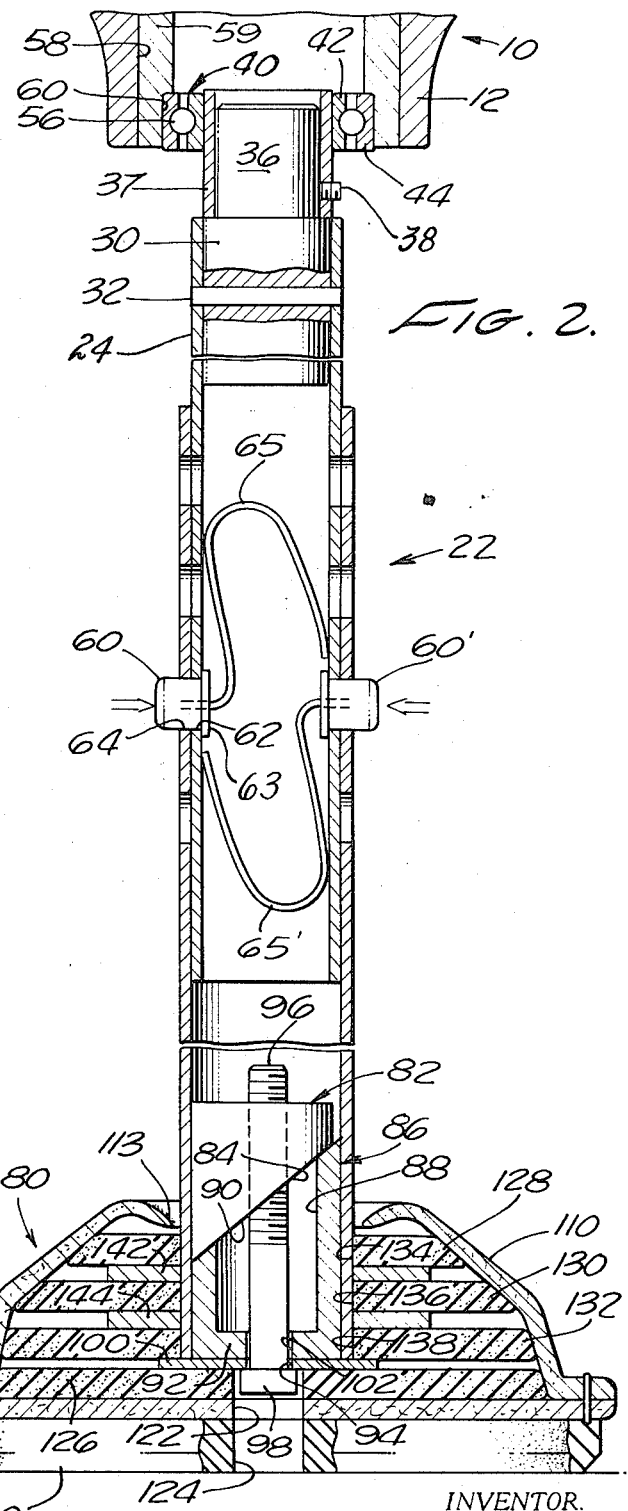
FIG. 2.
INVENTOR.
ROBERT D. MORGAN
BY Herzig & Walsh
ATTORNEYS

ARTIFICIAL LEG

This application is a continuation-in-part of U. S. Pat. application Ser. No. 880,736 filed on Nov. 28, 1969 and now abandoned.

SUMMARY OF THE INVENTION

The invention is an artificial leg having certain new and useful characteristics, particularly adapting it for use by amputees engaging in activities requiring freedom of movement, such as golf. A preferred exemplary form of the invention is described in detail herein. The characteristics of the invention and its object may best be understood in the light of the limitations of typical artificial limbs and the needs of an amputee undertaking activities requiring various degrees of freedom of movement such as golf. The artificial leg of the invention finds adaptability for use by amputees engaged in many other activities.

BACKGROUND OF THE INVENTION

Artificial legs and other prosthetic devices of this category in the prior art have a fairly typical construction. Typically, a joint is provided at the knee which provides a hinge comparable to that of a natural knee. The hinge may be of a ball and socket type. Typically, there is an artificial foot at the end of the leg attached to it by a joint. This joint may be a ball and socket joint also. While, of course, when fitted with such an artificial leg, it enables the amputee to walk and perform certain activities, but within quite stringent limitations. Obviously, the amputee does not have the control of the knee joint that he would have in a natural leg. Furthermore, the artificial foot must of course be aligned with the leg. This, obviously imposes very severe limitations when activities requiring any great degree of freedom of movement are considered. The artificial foot has to be maintained in alignment with the leg; and of course, there is no control comparable to that of a natural foot.

The herein invention provides an artificial leg having certain particular characteristics which very greatly increases its adaptability to performing activities requiring a high degree of freedom of movement of the body. In the preferred, exemplary form of the invention as described herein, the leg is simply in the form of a stem which is attached to the socket through a bearing providing for 360° rotation. There is no hinge at the position of the knee. The parts in that respect are rigid. There is no artificial foot as such, but rather a foot is provided which is preferably round. The end of the leg is attached to the center of the foot member. The foot is symmetrical about the center so that there is no problem of alignment, that is, the leg can rotate through any angular amount relative to the socket. The position of the foot is always relatively the same. Also, the foot member is constructed to provide a cushioning, shock absorber effect and also to allow angular tilting of the leg part relative to the foot. These particular characteristics in the artificial leg make it possible for the wearer to undertake and perform many activities which would not be possible with the typical type of artificial leg. The use of the artificial leg of the invention by an amputee playing golf is particularly illustrative of its advantages.

In playing golf, the golfer takes a stance in which he is of course supported on both legs. In executing a golf swing, the golfer pivots with the weight shifting from one foot to the other and back again. In executing the pivoting action, each leg has to rotate relative to the foot and must assume different angular positions relative to the position of the feet. The artificial leg of the invention adapts itself ideally to these movements without being hampered by the typical type of artificial limb for support having a knee joint and an ankle joint with an artificial foot.

In the preferred form of the invention, the leg is provided with a joint between the socket and leg part providing for relative 360° rotation between these parts. Thus, it may be seen that the arrangement permits the golfer to pivot or rotate his torso and upper thigh or thighs, this joint allowing the relative rotation between the socket and leg part.

The end of the leg part attaches to the foot by way of a shock absorbing cushioning joint which allows tilting of the leg part to an angular position relative to the foot while the foot remains in the same position on the ground. Since the foot is round and thus symmetrical about its center, there is no problem of alignment with the leg. As may be seen, the leg accommodates itself to movements which would be made by an amputee while participating in an active sport such as golf. The required movements are not hindered or prevented as would be the case with typical types of artificial legs.

The primary object of the invention in the light of the foregoing is to make available or to realize an artificial leg or limb which is particularly adapted for use by amputees engaging in active sports or other activities and which accommodates itself to movements necessary to such activities.

A further object of the invention is to provide an artificial leg as in the foregoing comprising a socket and a lower leg part joined thereto by way of a joint allowing for 360° rotation between the parts (the joint being otherwise rigid) whereby to enable the amputee to readily undertake particular movements while still being supported by the artificial leg.

Another object is to provide a leg as in the foregoing, including a foot attached to the leg part by way of a cushioning shock absorber which also allows freedom of tilting of the leg part relative to the foot in any direction.

A further object is to provide a leg as described with a foot which is round and therefore symmetrical about its center so that it never becomes misaligned with the leg.

BRIEF DESCRIPTION OF THE DRAWINGS

Further objects and additional advantages of the invention will become apparent from the following detailed description and annexed drawings, wherein:

FIG. 1 is a pictorial view of a preferred form of the invention;

FIG. 2 is a sectional view taken along 2—2 of FIG. 1; and

FIG. 3 is a diagrammatic view illustrating use of the invention.

DESCRIPTION OF THE PREFERRED EMBODIMENT

Referring to FIG. 1 of the drawings, the artificial leg comprises a socket part 10 adapted to receive the stump of a leg which has been amputated. Preferably, the socket is formed from a very light material such as aluminum or plastic so as to limit its weight as much as possible. Its exterior configuration is generally cylindrical and tapered, the lower end being smaller as shown at 12. At the upper part of the socket there is a narrow flange 14, the configuration being to adapt the socket to comfortably receive the stump. The leg may be attached to the body of the wearer by means of a harness as designated at 18 made of straps. This harness may be of a conventional type already known.

Below the socket is the lower leg part 22 which in the form of the invention is tubular.

The leg part comprises a further tubular part 24 that telescopes into the part 22 as shown. The upper tubular part 24 is secured to a cylindrical fitting 30 by way of stem 32. The fitting 30 has an upper cylindrical part 36 fitting in sleeve 37 and held by screw 38 which has a press fit in a bearing as designated at 40. This bearing comprises an inner race 42 and an outer race 44. The inner race and outer race form a raceway for ball bearing members as designated at 56. In the end of the socket 10, there is a bore 58 in which is cylinder 59 having counterbore 60 which receives the bearing 40. Thus, as may be seen, 360° freedom of rotation is provided for between the socket 10 and the leg with very little friction. The position of the bearing is shown in FIG. 1. It is to be observed that there is no hinged joint or knee between the socket and leg, these parts being rigidly aligned.

Tubular leg members 22 and 24 are axially adjustable for the length of the leg part. Numeral 60 designates a button member extending through a hole 62 in tubular part 24 and through a hole 64 in tubular part 22. Button 62 has a flange 63 and is held in position by bow spring 63. Numeral 60' designates a similar oppositely disposed button cooperating with similar holes. The telescoping parts can be moved axially relative to each other to adjust the length of the leg, and then the two parts can be rigidly secured together by means of buttons 60 and 60' engaging in axially spaced holes in the parts as shown. Buttons 60 and 60' are readily actuatable by applying thumb and finger pressure by hand so that an amputee can adjust the length of the leg while wearing it.

The foot member is readily detachable and reattachable to the leg part. The attachment means comprises a circular member 82 having a bevelled cam surface 84 and another cylindrical member 86 having a bore 88 and oppositely inclined or bevelled cam surface 90. The cam surfaces engage each other as shown. The cylindrical member 86 has an end 92 having a bore 94. The members 82 and 86 are telescoped into the end of leg member 22 as shown and they are held together by a bolt 96 having a head 98 with an opening to receive an Allen head wrench. Adjacent to the end 92 of the member 86 is a flat metal plate 100 which may be made of aluminum, for example. It has an aperture 102 in it. The bolt 96 extends through this aperture and through the bore 94 and is threaded into the circular member 82 which is solid. When the bolt 96 is tightened, the members 82 and 86 have their cam surfaces drawn together which produces a relative lateral movement between them so that they can firmly and securely clamp within the end of the tubular end part 22. Plate 100 is drawn firmly against the end of part 22.

In the exemplary form of the invention as described herein, the foot member 80 is round. It might be approximately 6 inches in diameter. Plate 100 is approximately 2 inches in diameter.

The foot member 80 comprises an outer dome-shaped covering 110 made of saddle leather having an extending flange 112 and top opening 113. Numeral 114 designates a flat, circular disc of saddle leather, the periphery of which is secured to the flange 112 by stitching shown at 116. Secured to the underside of the leather disc 114 is a piece of crepe rubber which is attached by barging, that is, it is adhesively secured to the leather member 114 by being glued thereto. The leather member 114 has a central bore 122, and the crepe rubber member has a central bore 124, these bores accommodating access to bolt 96.

Metal plate 100 is spaced as shown from the leather disc 114; and between this part is another circular crepe rubber member 126, the edges of which extend to the covering member 110, as shown. In the exemplary form of the invention, the crepe rubber member 120 may be one-half inch thick and the member 126 may be three-eighths inch thick. Numerals 128, 130, and 132 designate additional crepe rubber members having central apertures as designated at 134, 136, and 138. These members are fitted on to the part 22 as shown and are spaced apart by leather spacer members as designated at 142 and 144. These members are made of the same material as the dome-shaped member 110. They preferably have less thickness than the crepe rubber members 128, 130, and 132 as shown. The edge or peripheral parts of the members 128, 130, and 132 extend to the inside of the covering member 110, these edge parts being bevelled off as shown.

From the foregoing, it will be understood that the foot member 80 can readily be attached to and attached from leg 22. Since it is symmetrical, there is no problem of alignment with the socket 10. It of course can rotate with the leg about the bearing 40, there being full freedom of rotation with no problem of alignment. The construction of the foot member 80 provides a shock absorbing, cushioning effect which contributes to its utility. The construction of the foot member also allows for angular tilt of the leg with respect to the foot, the parts being retained in position because of their interleaving, interengaging relationship, as described.

The use of the leg may be readily understood from FIG. 3. As may be observed in FIG. 3, the leg as a whole can tilt in any direction from a vertical position over the foot member or shoe 80 as shown, while the foot member remains in the same position on a surface. This tilting is allowed by the flexibility of the rubber and leather material interposed between the leg 22 and the foot member. At the same time, the socket 10 can freely rotate about the bearing 40 between the socket and the upper tubular member 24 as illustrated by the curved arrow in FIG. 3.

From the foregoing, those skilled in the art will readily observe that the invention embodies very distinct utilities and advantages. It is simple in construction and can be made very light in weight which is an extremely important factor. It is readily adjustable in length, even while being worn. This is very important because, the amputee may wish to adjust the length to accommodate to different types of activities. There being no hinged joint at the knee, the problem of lack of control of such a joint is eliminated; and the foot being symmetrical, there is no problem of alignment with the result that the amputee has a much greater degree of control of the leg which makes it possible for him to engage in activities which he could not consider wearing a typical type of artificial leg. The bearing between the socket and the leg as explained allows for full freedom of rotation or twist from the stump relative to the leg and the foot which makes it possible for the amputee to execute bodily movements such as those required in swinging a golf club. The foot provides shock absorbing, cushioning effect while at the same time allowing appropriate degree of tilt relative to it.

From the foregoing, those skilled in the art will readily understand the nature of the invention and its construction and the manner in which it achieves and realizes all of the objects set forth herein.

The foregoing disclosure is representative of a preferred form of the invention and is to be interpreted in an illustrative rather than a limiting sense.

What is claimed is:

1. An artificial leg comprising a socket adapted to receive a stump; a leg part extending from said socket and having rigid, inflexible alignment with said socket along a longitudinal vertical axis; and means providing a joint between said leg part and said socket including a bearing providing for substantially 360° freedom of rotation as between said socket and leg part about said axis, said joint means maintaining said rigid alignment at all rotative positions between said socket and leg part.

2. An artificial leg as in claim 1, including a foot member at the end of said leg part, said leg part being joined to the foot member at the center thereof and the foot member being symmetrical about said center.

3. An artificial leg as in claim 2, wherein said foot member has means to provide shock absorbing cushioning resiliency and to allow tilt of the leg part from the vertical with respect to the foot member.

4. An artificial leg as in claim 1, including means for adjusting said leg part for length.

5. An artificial leg as in claim 3, wherein said foot member is circular, said foot member having a bottom layer of resilient cushioning material and means providing resilient attachment of the leg part to the foot member.

6. An artificial leg as in claim 3, wherein the end of said leg part is attached centrally within the foot member, the end of the leg part having attachment to the foot member, and attachment means comprising interleaving members surrounding the end of the leg part, said interleaving members comprising laminations of resilient cushioning material and semi-rigid material.

7. An artificial leg as in claim 6, comprising a covering of saddle leather covering said foot member.

8. An artificial leg as in claim 6, said covering having a flat bottom surface, said resilient cushioning material being secured to the flat bottom portion by being glued thereto.

9. An artificial leg as in claim 2, said leg part being tubular, and attachment means between the leg part and foot member including cylindrical members fitting within, said leg part having juxtaposed bevelled cam surfaces, and means to draw said cylindrical members together whereby to produce relative lateral movement for locking to said leg part.

* * * * *